United States Patent
Ooishi et al.

(10) Patent No.: US 6,748,769 B2
(45) Date of Patent: Jun. 15, 2004

(54) METHOD OF PRODUCING GLASS PARTICLES DEPOSIT

(75) Inventors: Toshihiro Ooishi, Kanagawa (JP); Yuichi Ohga, Kanagawa (JP); Yoshio Yokoyama, Kanagawa (JP); Motonori Nakamura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/995,857

(22) Filed: Nov. 29, 2001

(65) Prior Publication Data
US 2002/0062666 A1 May 30, 2002

(30) Foreign Application Priority Data

Nov. 29, 2000 (JP) ........................................ 2000-362829

(51) Int. Cl.[7] .............................................. C03B 37/014
(52) U.S. Cl. .......................................... 65/421; 65/436
(58) Field of Search ........................ 65/414, 421, 422, 65/415, 413, 520, 522, 523, 531, 534, 436

(56) References Cited

U.S. PATENT DOCUMENTS

| | | | |
|---|---|---|---|
| 4,726,827 A | * | 2/1988 | Powers ........................ 65/415 |
| 5,116,400 A | | 5/1992 | Abbott et al. |
| 5,958,102 A | | 9/1999 | Shimada et al. |
| 6,321,573 B1 | * | 11/2001 | Fritsche et al. ................ 65/421 |
| 6,546,759 B1 | * | 4/2003 | Tobisaka et al. .............. 65/531 |

FOREIGN PATENT DOCUMENTS

| | | |
|---|---|---|
| EP | 0 476 218 | 3/1992 |
| EP | 0 845 441 | 6/1998 |
| JP | 3-228845 | 9/1991 |
| JP | 3-228845 | 10/1991 |
| JP | 4-260618 | 9/1992 |
| JP | 05-116980 | 5/1993 |
| JP | 10-158025 | 6/1998 |

* cited by examiner

Primary Examiner—Peter Chin
Assistant Examiner—Carlos Lopez
(74) Attorney, Agent, or Firm—McDermott, Will & Emery

(57) ABSTRACT

A plurality of glass particle synthesizing burners are disposed opposite to a rotating starting rod. The starting rod and the glass particle synthesizing burners are relatively reciprocally moved to each other in parallel to the axial direction, so that glass particles synthesized by the burners are sequentially deposited on the surface of the starting rod. The movement is stopped and restarted repeatedly once or more than once during one reciprocal movement.

18 Claims, 3 Drawing Sheets

BURNER INTERVAL

METHOD OF PRODUCING GLASS PARTICLES DEPOSIT

BACKGROUND OF THE INVENTION

1. Field of the Invention

The present invention relates to a method of producing a glass particles deposit by depositing glass particles on a starting rod in a radial direction of the starting rod while relatively moving the starting rod and burners for synthesizing glass particles. Specially, the present invention relates to a method of producing glass particles deposit such that the glass particles deposit with a smaller noneffective portion can be obtained; an amount of glass particles to be deposited is finely adjustable; and deposition efficiency of glass particles is high.

2. Description of the Related Art

There is a method of producing a large-sized optical fiber preform at high speed (a multi-layers soot deposition), comprising the steps of, as shown in FIG. 5, disposing a plurality of glass particle synthesizing burners 7 at predetermined intervals opposite to a starting rod 1 in a vessel 4, and depositing glass particles (soot) in layers on the surface of the starting rod 1 while relatively reciprocally moving the rotating starting rod 1 and a row of burners 7, so that a glass particles deposit (soot body) 6 is obtained. FIG. 5 shows an example of the starting rod 1 that is vertically reciprocally moved.

In the method of depositing glass particles (soot deposition method), the relative movement distance (may also be called the traverse distance) between the starting rod and the burners may be set substantially equal to the distance between adjacent burners (hereinafter called the burner interval) in order to obtain the high deposition efficiency of the glass particles. In this case, there is a problem that the fluctuation of the outer diameter of the glass particles deposit (soot body) occurs in a longitudinal direction of the soot body. The outer diameter fluctuation of the soot body is caused by the fact that there arises a moment when the relative movement (may be also be called the traverse) between the starting rod and the burners always stops at a turn-back position (may also be called the traverse end portion) of the relative movement. Namely, the substantial time for depositing the soot (hereinafter called the soot deposition time) at the turn-back position tends to become longer than that is required in a normal portion where the relative movement is made at a steady rate. Further, the degree of touching of the burner flame onto the soot body at the turn-back position is different from that of the normal portion. In case where the relative movement distance is constant, the turn back position always falls on the same position of the starting rod, so that the fluctuation of the outer diameter is promoted. Generally, more soot is deposited in a portion whose surface area is large. Therefore, once the outer diameter of a portion becomes larger than other portion, the growth of the outer diameter difference among them is accelerated.

In order to obtain an optical fiber preform of good quality, it is important to reduce the fluctuation of the outer diameter of the soot body as much as possible and various methods for the purpose have been proposed.

For example, there has been proposed a method of reducing the fluctuation of such an outer diameter by moving the turn-back position of the traverse in a predetermined direction for each turn, and after the turn-back position is moved up to a predetermined position, moving the turn-back position of the traverse in the opposite direction for each turn until the turn-back position of the traverse is moved back to the initial position of the traverse. This method allows the traverse end portion of the traverse to be dispersed over the whole soot body. Therefore, the substantial soot deposition time and the fluctuation of the degree of touching of the burner flames onto the soot body are averaged over the whole soot body. As a result, the deposition amount of the soot can be uniform in the longitudinal direction thereof (Japanese Patent Unexamined Publication No. Hei. 3-228845).

There has been proposed another method of reducing the fluctuation of an outer diameter with Japanese Patent Unexamined Publication No. Hei. 3-228845 as a base by measuring the fluctuation of the outer diameter of the whole soot body and conducting, by an auxiliary burner, the additional soot deposition in a portion wherein the deposition quantity of the soot body is small (Japanese Patent Unexamined Publication No. Hei. 10-158025). The fluctuation of the outer diameter is measured by using a CCD camera capable of monitoring the whole area of the soot body and a central information processing unit. The auxiliary soot deposition burner can independently traverse the whole area of the soot body.

Moreover, there exists still another method of reducing a temperature gradient in the longitudinal direction of the soot body at the time of soot deposition by supplying clean air to the whole soot body in a direction perpendicular to the longitudinal direction of the soot body in the case of conducting the soot deposition while moving the turn-back position of the traverse (Japanese Patent Unexamined Publication No. Hei. 4-260618).

FIG. 6 shows a situation in which the relative position between the starting rod and the burners varies with time in the above-described method, and in which the tapered portion can be minimized in this kind of method. In FIG. 6, there are shown portions of the outermost burner 2 and the second burner 3 in a row of burners. Numerical values on the right-hand side indicate the number of deposited layers of soot on the starting rod 1 during a series of reciprocal movements until the turn-back position is returned to the initial position. As the soot formed by the second burner and thereafter are formed in portions below 18 layers of FIG. 6, the number of layers constantly remains to be 20.

In the case of the method of moving the turn-back position of the traverse, however, as shown in FIG. 6, the soot deposited by the burners positioned at both ends of the snot body is tapered down (because the number of deposited layers decreases to both end portions of the soot body). As seen from FIG. 6, although the number of deposited layers decreases in only the portions wherein soot is deposited by the burners at both ends, the soot deposited by a burner adjacent to the burners at both ends also tends to easily flow outside along the tapered shape. Therefore, most of the soot portions deposited by the second burners positioned from both ends become tapered, which results in forming noneffective portions.

SUMMARY OF THE INVENTION

An object of the present invention is to provide a method of producing glass particles deposit such that the glass particles deposit having a smaller noneffective portion can be obtained; an amount of glass particles to be deposited is finely adjustable; and deposition efficiency of glass particles is high.

As means for solving the foregoing problems, the invention is constituted of the following shown in (1) to (9):

(1) A method of producing glass particles deposit comprises: disposing a plurality of glass particle synthesizing burners opposite to a rotating starting rod; relatively reciprocally moving the starting rod and the glass particle synthesizing burners in parallel to an axial direction of the starting rod; depositing glass particles synthesized by the burners on the surface of the starting rod, wherein the relative movement is stopped and restarted while it is made from one turn-back position up to the other turn-back position of the reciprocal movement. The relative movement may be stopped and restarted during one reciprocal movement.

(2) A method of producing glass particles deposit as described in (1), wherein the plurality of glass particle synthesizing burners are disposed uniformly at predetermined burner intervals.

(3) A method of producing glass particles deposit as described in (2), wherein the plurality of glass particle synthesizing burners are disposed in a row in parallel to the starting rod.

(4) A method of producing glass particles deposit as described in (2), wherein a moving distance in one direction of the reciprocal movement is set twice of the burner interval or shorter.

(5) A method of producing glass particles deposit as described in (4), wherein the moving distance in the one direction of the reciprocal movement is set substantially equal to or substantially twice of the burner interval.

(6) A method of producing glass particles deposit as described in (1)–(5), wherein a distance between the adjacent stop points including turn-back points of the relative movement is within the range of 5 to 40 mm.

(7) A method of producing glass particles deposit as described in (1)–(6), wherein the step of depositing glass particles is terminated at a point of time when the burners arrive at the turn-back position of the reciprocal movement.

(8) A method of producing glass particles deposit as described in one of (1) to (7), wherein a stop time at stop point of the relative movement is set different from a stop time at the turn-back position of the reciprocal movement.

In the present invention, the condition brought about at the turn-back position in the reciprocal movement (stopping of the burner) is created positively in the middle of the movement. Therefore, it is possible to solve the problem of fluctuation of the outer diameter in the prior art. Further, it is possible to solve the problems of an increase in the noneffective portion formed in both end portions of the soot body, and a difficulty in precisely controlling the weight of the soot body and so forth.

DETAILED DESCRIPTION OF THE INVENTION

Figure 1:
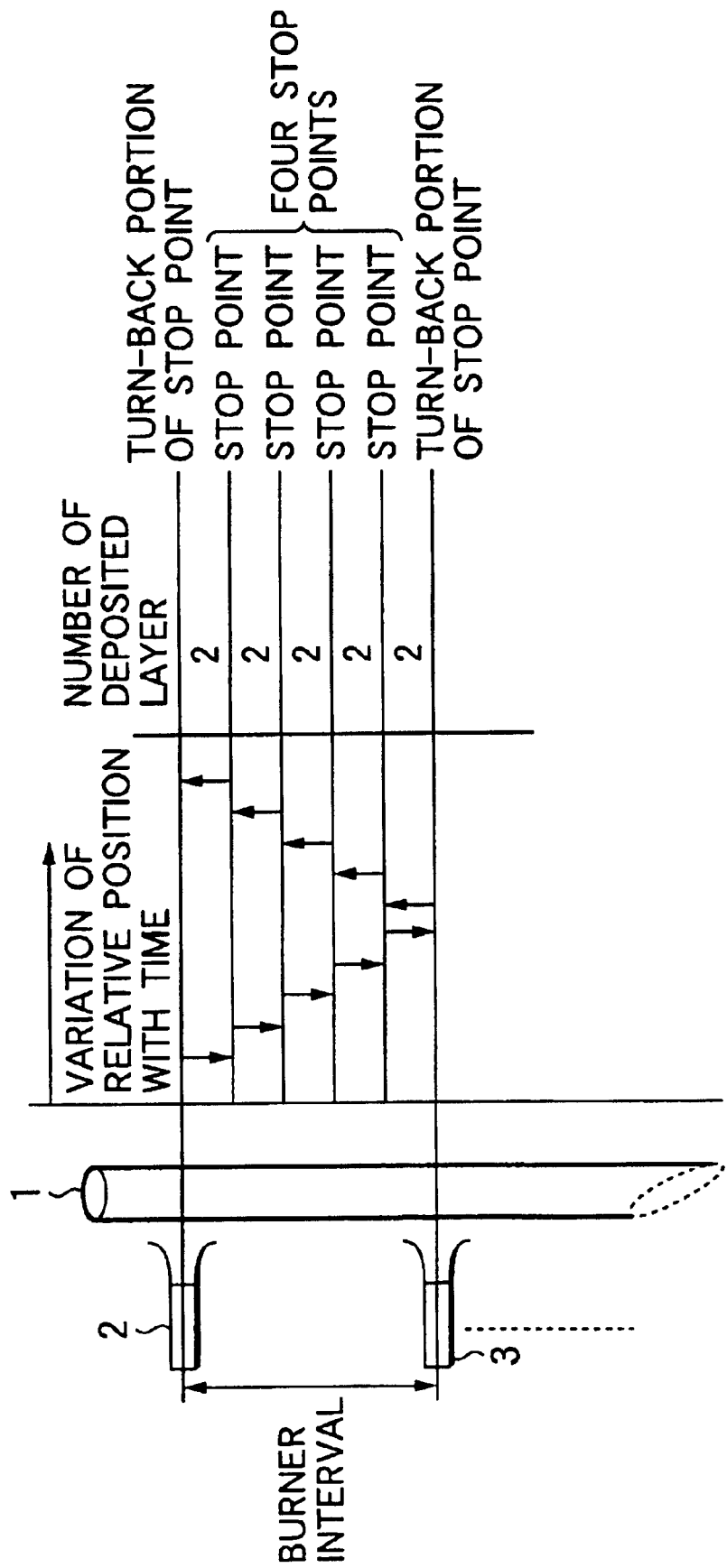
FIG. 1 is a diagram showing an example of the condition of relative movement between a starting rod and burners according to the present invention.

FIG. 1 shows an example of the condition of relative movement between a starting rod and burners according to a method of depositing glass particles of the present invention. In this example, a starting rod 1 and burners (the outermost burner 2 and the second burner 3 are only shown) are relatively reciprocally moved by the burner interval. In FIG. 1, there are provided four stop points of movement between turn-back positions at both ends for the reciprocal movement of the outermost burner 2 and the starting rod 1. In FIG. 1, the variation of the relative position between the outermost burner 2 and the starting rod 1 with time is shown. Therefore, the number of deposited layers of soot per reciprocal movement can be uniformly two and the influence of the stop points is uniformized, so that the fluctuation of the outer diameter is reduced.

In order to uniformize the number of deposited layers of soot on the starting rod during the reciprocal movement, it is preferred for burners to be uniformly disposed so that the burner interval is uniformized.

Figure 2A:
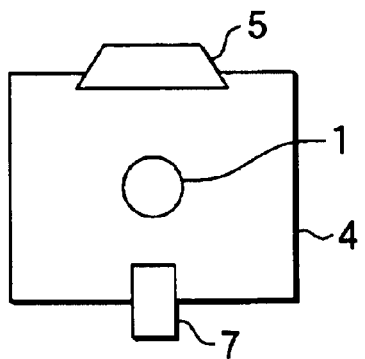
FIG. 2A is a top view of an example of a burner layout.
Figure 2B:
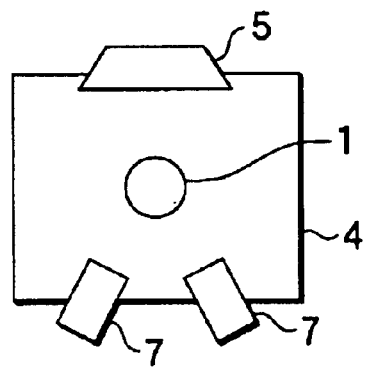
FIG. 2B is a top view of another example of a burner layout where a plurality of rows of burners are disposed in parallel to each other.

FIGS. 2A and 2B show layout drawings of burners and the starting rod when seen from upside of the apparatus. With respect to a disposition of burners, a row of burners 7 may be disposed in parallel to the starting rod 1 as shown in FIG. 2A (although FIG. 2A shows only one burner, remaining burners forming the row are continuously disposed below). A plurality of rows of burners 7 may be disposed in parallel to the starting rod 1 as shown FIG. 2B.

Figure 3:
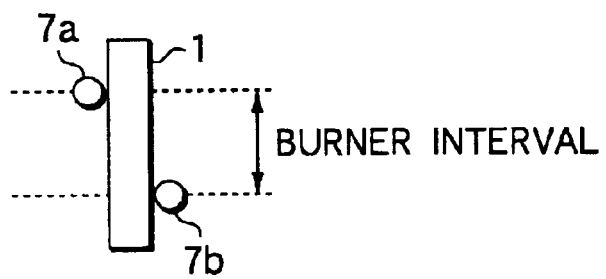
FIG. 3 is a diagram defining a burner interval in case where burners are not disposed in a row.

From the standpoint of exhaust efficiency, an arrangement of burners in a row as shown in FIG. 2A is preferred. The arrangement of the burners in the plurality of rows as shown in FIG. 2B can make the burner interval shorter than that in the case of disposing the burners in a row as shown in 2A because no interference is caused between the flames of adjoining burners. This is advantageous from the viewpoint of improving the deposition rate of soot because more of burners are usable for the starting rod having the same length. Here, the burner interval, when the burners are arranged in the plurality of rows, is the distance in the axial direction of the starting rod between burners which are adjoining in the axial direction of the starting rod. For example, when the burners are arranged in two rows as shown in FIG. 3, the burner interval is the distance in the axial direction of the stating rod 1 between a burner 7a of one row and a burner 7b of the other row which are adjoining in the axial direction of the starting rod 1.

A moving distance in one direction in the relatively reciprocal movement (the distance from one turn-back position up to the other turn-back position in the relative reciprocal movement) is preferably set twice or less than the burner interval. The reason for this is that the length of the both end portions wherein the number of deposited layers is smaller than those of the central portion becomes long if the moving distance in one direction exceeds twice of the burner interval, whereby the effect of reducing the tapered portion, that is, the effect of reducing a noneffective portion is diminished. Moreover, a desirable moving distance is integer times of the burner interval to uniformize the number of deposited layers. However, no problem is practically developed as long as the moving distance is close to integer times of the burner interval. Further, as it is possible to make an adjustment by changing the stop time at the stop point, the moving distance may be set substantially equal to or substantially twice of the burner interval. More specifically, the moving distance should be in the range of $(1\pm0.05)$ times to $(2\pm0.05)$ times of the burner interval and should be more preferably in the range of $(1\pm0.03)$ times to $(2\pm0.03)$ times of the burner interval.

With respect to the distance between the stop points of movement (including the distance between the turn-back position and the stop point), when portions where the distance between adjacent stop points is short and portions where the distance between other adjacent stop points is long are coexisted, the fluctuation of the outer diameter occurs. Therefore, it is important to set such a distance that the effect of dispersion of the stop points is substantially achievable and that only a few differences exist among the distances between the stop points. There is a method of determining the distance between stop points by, for example, defining the distance between the stop points as $A\div(B+2)$ (mm) where A=burner interval$\times 2$ (mm), and B=the number of stop points excluding a turn-back position per reciprocal movement. The way to determine the distance is not limited to this method. It is convenient in operation to fix the distance between the stop points; however, the distance can be changed properly with every turn-back.

In case where the distance between the stop points of movement is too short, a portion having an irregular diameter which causes fluctuation of the outer diameter of the soot body is produced before the dispersion of abnormally sooted points (stop points) is completed. Therefore, the effect of reducing the fluctuation of the outer diameter is diminished. In case where the distance between the stop points of movement is too long, no effect of dispersion of abnormally sooted points (stop points) is achievable. As a result, the distance between the stop points is preferably set in the range of 5 to 40 mm. However, depending on the characteristics of burners, setting of a distance of slightly longer than 40 mm is desirable. The distance range is not limited to above mentioned range.

Figure 4A:
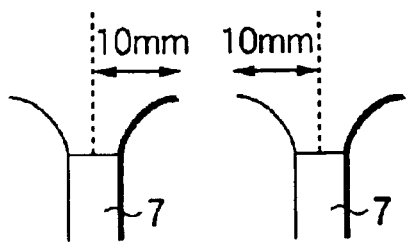
FIGS. 4A and 4B are diagrams explaining relation between the flame of burner and the burner interval.
Figure 4B:
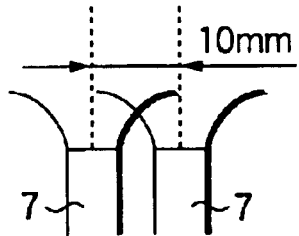
Figure 5:
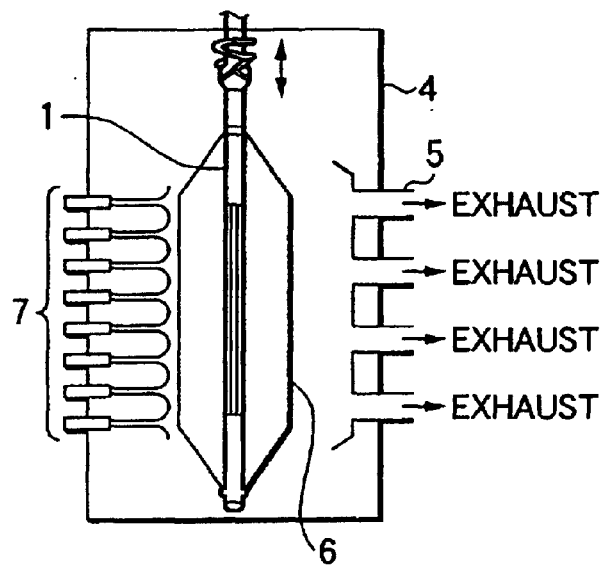
FIG. 5 is a diagram explaining a soot body produced by a multi-layer soot deposition method.
Figure 6:
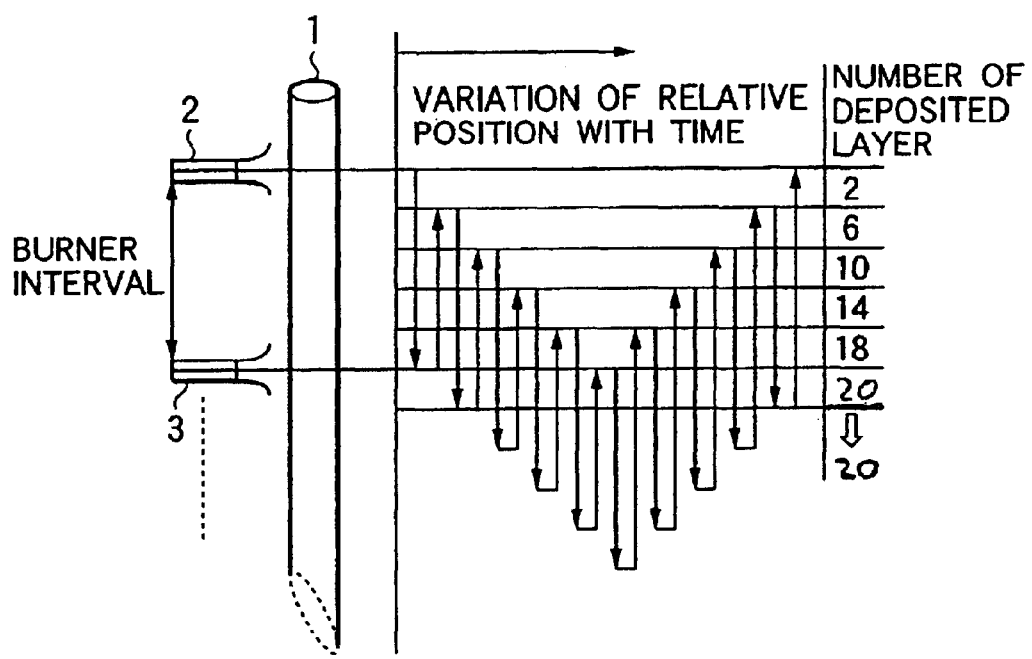
FIG. 6 is a diagram explaining a situation in which the relative movement between the starting rod and burners in the prior art method.

A further description will be given of the fact that the effect of reducing the fluctuation of the outer diameter is diminished when the distance between the stop points is too short. When the distance between the stop points is short, the fluctuation of the outer diameter at stop points to be dispersed is amplified. A range where a large amount of soot can be deposited is assumed to exist within ±10 mm from the center of the flame of the burner, for example. In case where a distance up to the next stop point is 20 mm or greater, the range where the large amount of shoot is deposited by the burner is not overlapped with that at the next stop point (FIG. 4A). However, in case where the distance between the stop points is only 10 mm, the ranges where the large amount of soot is deposited are overlapped by 10 mm (FIG. 4B). If the deposition amount of soot is too large at the overlapped portion, the fluctuation of the outer diameter starts to occur therein and then the surface area of the portion is increased. As a result, the deposition efficiency at the large surface area is improved, so that the fluctuation of the outer diameter is promoted as the deposition time of soot passes.

Although the optimum burner interval varies with the method of disposing burners, characteristics of the burners and so forth, preferable distance is one from 50 to 400 mm and more preferable the distance is one from 150 to 350 mm. In case where the burner interval is too short, the flames of adjoining burners interfere with each other, thus causing a reduction in the deposition efficiency and the fluctuation of the outer diameter. Even though burners having a small expanse of flame are employed and the burners are not disposed in a row as shown in FIG. 2B, the marginal distance is 50 mm.

In case where the burner interval is too large, the number of burners are resulted in decreasing, which also results in a reduction in the deposition efficiency. With the burner interval being too large, moreover, cracking is produced as the temperature of the soot body lowers. It is thus preferred to set the maximum distance to 400 mm. In the case of glass particle synthesizing burners in general use, further, good results are obtainable by adjusting the burner interval within the range of 150 to 350 mm.

A traverse rate (moving rate in the relatively reciprocal movement) is especially effective in the range of 100 to 1,300 mm/min. This is because the influence of abnormally sooted points (stop points) can be dispersed without the fluctuation of the outer diameter if the traverse rate is set to be higher than usual in order to decrease the amount of soot to be deposited during the reciprocal movement. By selecting the traverse rate like this, the average thickness of soot per layer can be so controlled as to set the thickness in the range of 1 to 0.01 mm as occasion demands. This is advantageous when the deposition step is terminated with a target outer diameter of the soot body. However, the traverse rate above is not restricted to that range, depending on the target size of the-soot-body, the characteristics of the soot body and so on.

In the case where the relative movement stops in both direction ways during one reciprocal movement, the number of deposited layers is uniformized over the whole effective portion at a point of time when the relative movement arrives at the turn-back position of the reciprocal movement. Therefore, it is preferred to set the time of terminating the soot deposition at the point of time when the relative movement arrives at the turning back point of the reciprocal movement. In the case where the relative movement stops in one direction way during one reciprocal movement, the soot deposition is preferably terminated at a point of time when the relative movement is returned at the initial position of the reciprocal movement.

Due to differences in the kind of the burner, the distance between the surface of the soot body and the burner, and so forth, in case where the stop time at the turn-back position is made equal to the stop time in the middle of the traverse, there is brought about a difference in the amount of deposits because of the overlapping of adjoining burners at the turn-back position, thus causing the increase of the fluctuation of the outer diameter. In this case, the fluctuation of the outer diameter can be reduced by adjusting the stop time at the stop point to be different from the stop time at the turn-back position. Generally, it is preferable to set the stop time in the middle of the traverse longer than the stop time at the turn-back position. The adjustment of the stop time may properly be made, depending on the burner for use and the distance from the burner up to the surface of the soot body.

EMBODIMENT 1

A specific method of producing glass particles deposit embodying the present invention will now be described; however, the invention is not limited to this embodiment.

EXAMPLE 1

The soot deposition was provided on the pattern shown in FIG. 1 in a method of vertically reciprocal a starting rod with a row of five burners disposed at intervals of 200 mm opposite to the starting rod. Conditions for the soot deposition includes: traverse distance=200 mm, traverse rate (average rate)=400 mm/min, distance between stop points= 20 mm, stop time at the stop point in the middle of the traverse=1 sec, and stop time at the turn-back position=0.5 sec. The starting rod used was prepared by elongating a core-contained rod into what has a diameter of 36 mm.

The reciprocal movement was stopped when the number of reciprocations reached 356, 357, 358, 359 and 360 and the then weight of soot body was measured. The weight of the soot body was changed from 22.3 kg to 22.4 kg, 22.5 kg, 22.6 kg and 22.7 for respective the number of reciprocations. According to this method, the weight of the soot body was found controllable with 100 g as a unit during the soot deposition per reciprocal movement. Moreover, the diameters of effective portions of the soot body were 217.4 mm, 218.1 mm, 218.7 mm, 219.4 mm and 220 mm, respectively.

Further, the length of the effective portion of the soot body obtained was 540 mm, and 280 mm of each of both end portions (portions from both ends to positions apart from the both ends by 280 mm) was tapered.

The fluctuation of the outer diameter in the radial direction of the soot body having an outer diameter of 220 mm indicated 220±2.5 mm. When the soot body was then consolidated and vitrified, the fluctuation of the outer diameter measured 145±1.4 mm in the effective portion.

COMPARATIVE EXAMPLE 1

The soot deposition was provided in a method of vertically reciprocally moving a starting rod with a row of four burners disposed at intervals of 200 mm opposite to the starting rod. Conditions for the soot deposition includes: traverse rate =800 mm/min. The soot deposition is conducted by a traverse method comprising the steps of conducting a first operation, in which the starting rod is lowered by 200 mm and then it is pulled up by 180 mm, repeatedly until the traverse turn-back position is moved by what was equivalent to the burner interval; and conducting, after the first operation, a second operation, in which the starting rod is lowered 200 mm and then it is pulled up by 220 mm, repeatedly until returning the turn-back position to the initial position. The starting rod was the same as what was employed in Example 1.

In this method, in order to forming uniformly the outer diameter of the whole soot body, it is preferable that the soot deposition is conducted by considering the number of turns until the traverse start position is returned to the initial position as a set. For this reason, preferably, the soot deposition is terminated at integer times of the number of turns of the one set. However, this makes it difficult to stop the process with a desired deposition amount of soot. In this Comparative Example, 20 reciprocal movements are required for the dispersion of turn-back positions.

The traverse reciprocal movement was stopped when the number of reciprocations reached 760, 780, and 800 and the then weight of soot body was measured. The weight of the soot body was seen to change from 18.9 kg to 19.5 kg and 20.1 kg for respective the number of reciprocations. When the reciprocal movement was stopped every 20 reciprocations as the number of times for the termination of dispersion of traverse turn-back positions, it was found that the weight was controllable with only 600 g as a unit. The outer diameters of the effective portions of the soot body were 209.3 mm, 214.7 mm and 220 mm, respectively.

Further, the length of the effective portion of the soot body obtained was 400 mm, and 350 mm of each of both end portions was tapered.

The fluctuation of the outer diameter in the radial direction of the soot body having an outer diameter of 220 mm indicated 220±3.5 mm. When the soot body was then consolidated and vitrified, the fluctuation of the outer diameter measured 145±2.0 mm in the effective portion.

As the traverse method in Example 1 differs from that in Comparative Example 1, the longitudinal lengths of the soot body obtained also differ from each other. In order to make an accurate comparison, the burner interval was set to 200 mm, and five burners and four burners were used in Example 1 and Comparative Example 1 respectively so that the longitudinal lengths of the formed soot body might be almost same. Moreover, the soot deposition was terminated so as to uniformize the outer diameters of the soot body having the largest diameter in Example 1 and Comparative Example 1.

From the result of comparison between Example 1 and Comparative Example 1, the method of the invention can provide a fine adjustment of the external diameter of the soot body in comparison with the prior art. Further, while the noneffective portion can be decreased, the effect of reducing the fluctuation of the outer diameter is proved conspicuous.

As set forth above, according to the present invention, it is possible to solve the problem of an increase in the tapered portion at each end of the soot body. Further, it is possible to solve the problem of a difficulty in finely adjusting the outer diameter of the soot body. Therefore, a glass particles deposit having a smaller noneffective portion can be produced with high deposition efficiency and moreover the amount of glass particles for deposition (the amount of deposit of the soot) is also finely adjustable thereby.

What is claimed is:

1. A method of producing glass particles deposit, said method comprising:

disposing a plurality of glass particle synthesizing burners opposite to a rotating starting rod;

relatively reciprocally moving said starting rod and said glass particle synthesizing burners in parallel to an axial direction of said starting rod, wherein said starting rod and said glass particle synthesizing burners are reciprocally moved between at least two turn-back positions;

depositing glass particles synthesized by said burners on a surface of said starting rod, wherein the relative movement is stopped and restarted at least one point between two immediately adjacent turn-back positions, such that the relative movement continues in the same direction upon restarting as the relative movement immediately before stopping.

2. The method of producing glass particles deposit as claimed in claim 1, wherein the plurality of glass particle synthesizing burners are disposed uniformly at predetermined burner intervals.

3. The method of producing glass particles deposit as claimed in claim 2, wherein the plurality of glass particle synthesizing burners are disposed in a row in parallel to said starting rod.

4. The method of producing glass particles deposit as claimed in claim 2, wherein a moving distance in one direction of the reciprocal movement is set to twice the burner interval or shorter.

5. The method of producing glass particles deposit as claimed in claim 4, wherein the moving distance in the one direction of the reciprocal movement is set substantially equal to or substantially twice of the burner interval.

6. The method of producing glass particles deposit as claimed in claim 1, wherein a distance between the adjacent stop points including turn-back points of the relative movement is within the range of 5 to 40 mm.

7. The method of producing glass particles deposit as claimed in claim 1, wherein the step of depositing glass particles is terminated at a point of time when the burners arrive at the turn-back position of the reciprocal movement.

8. The method of producing glass particles deposit as claimed in claim 5, wherein the step of depositing glass particles is terminated at a point of time when the burners arrive at the turn-back position of the reciprocal movement.

9. The method of producing glass particles deposit as claimed in claim 1, wherein a stop time at stop point of the relative movement is set different from a stop time at the turn-back position of the reciprocal movement.

10. A method of producing glass particles deposit, said method comprising:

disposing a plurality of glass particle synthesizing burners opposite to a rotating starting rod;

relatively reciprocally moving said starting rod and said glass particle synthesizing burners in parallel to an axial direction of said starting rod;

depositing glass particles synthesized by said burners on a surface of said starting rod, wherein the relative movement is stopped and restarted between at least two turn-back positions, such that the relative movement continues in the same direction upon restarting as the relative movement immediately before stopping.

11. The method of producing glass particles deposit as claimed in claim 10, wherein the plurality of glass particle synthesizing burners are disposed uniformly at predetermined burner intervals.

12. The method of producing glass particles deposit as claimed in claim 11, wherein the plurality of glass particle synthesizing burners are disposed in a row in parallel to said starting rod.

13. The method of producing glass particles deposit as claimed in claim 11, wherein a moving distance in one direction of the reciprocal movement is set to twice the burner interval or shorter.

14. The method of producing glass particles deposit as claimed in claim 13, wherein the moving distance in the one direction of the reciprocal movement is set substantially equal to or substantially twice of the burner interval.

15. The method of producing glass particles deposit as claimed in claim 10, wherein a distance between the adjacent stop points including turn-back positions of the relative movement is within the range of 5 to 40 mm.

16. The method of producing glass particles deposit as claimed in claim 10, wherein the step of depositing glass particles is terminated at a point of time when the burners arrive at a turn-back position of the reciprocal movement.

17. The method of producing glass particles deposit as claimed in claim 14, wherein the step of depositing glass particles is terminated at a point of time when the burners arrive at a turn-back position of the reciprocal movement.

18. The method of producing glass particles deposit as claimed in claim 10, wherein a stop time at stop point of the relative movement is set different from a stop time at a turn-back position of the reciprocal movement.

* * * * *